United States Patent
Meacham, II et al.

(10) Patent No.: US 10,666,070 B2
(45) Date of Patent: May 26, 2020

(54) BATTERY CHARGE TERMINATION VOLTAGE REDUCTION

(71) Applicant: Fairchild Semiconductor Corporation, Sunnyvale, CA (US)

(72) Inventors: James A. Meacham, II, Gorham, ME (US); Robert A. Card, Scarborough, ME (US)

(73) Assignee: FAIRCHILD SEMICONDUCTOR CORPORATION, Phoenix, AZ (US)

( * ) Notice: Subject to any disclaimer, the term of this patent is extended or adjusted under 35 U.S.C. 154(b) by 215 days.

(21) Appl. No.: 15/395,317

(22) Filed: Dec. 30, 2016

(65) Prior Publication Data

US 2017/0201109 A1 Jul. 13, 2017

Related U.S. Application Data

(60) Provisional application No. 62/275,983, filed on Jan. 7, 2016.

(51) Int. Cl.
*H02J 7/00* (2006.01)
*H02J 7/04* (2006.01)

(52) U.S. Cl.
CPC .............. *H02J 7/0029* (2013.01); *H02J 7/04* (2013.01)

(58) Field of Classification Search
CPC .................................. H02J 7/0029; H02J 7/04
USPC ......................... 320/114, 128, 134, 136, 137
See application file for complete search history.

(56) References Cited

U.S. PATENT DOCUMENTS

| | | | |
|---|---|---|---|
| 6,665,801 B1 | 12/2003 | Weiss | |
| 7,890,783 B2 | 2/2011 | Tupman | |
| 8,736,227 B2 | 5/2014 | Chadbourne et al. | |
| 2004/0164708 A1 | 8/2004 | Veselic et al. | |
| 2005/0062459 A1* | 3/2005 | Young | G06F 1/305 320/134 |
| 2006/0181244 A1* | 8/2006 | Luo | H01M 10/441 320/128 |
| 2006/0192530 A1* | 8/2006 | Nguyen | G06F 1/263 320/128 |
| 2007/0024239 A1 | 2/2007 | Park | |

(Continued)

FOREIGN PATENT DOCUMENTS

| | | |
|---|---|---|
| CN | 2894028 Y | 4/2007 |
| CN | 102388520 A | 3/2012 |

(Continued)

OTHER PUBLICATIONS

"U.S. Appl. No. 12/714,054, Advisory Action dated Oct. 7, 2013", 3 pgs.

(Continued)

*Primary Examiner* — Zixuan Zhou
(74) *Attorney, Agent, or Firm* — Brake Hughes Bellermann LLP

(57) ABSTRACT

This document discusses, among other things, apparatus, systems, and methods to prevent a voltage of a charging battery from exceeding a voltage threshold, including receiving charging information from a battery and controlling an output current of a travel adapter, including adjusting the received battery current information using a load current to prevent the voltage of the battery from exceeding a voltage threshold, and providing output current limit information to the travel adapter using the adjusted battery current information.

17 Claims, 3 Drawing Sheets

(56) References Cited

U.S. PATENT DOCUMENTS

| | | |
|---|---|---|
| 2007/0067659 A1 | 3/2007 | Tevanian |
| 2009/0033278 A1 | 2/2009 | Ludtke |
| 2010/0219790 A1 | 9/2010 | Chadbourne et al. |
| 2015/0069951 A1* | 3/2015 | Wang .................... H02J 7/0052 320/107 |

FOREIGN PATENT DOCUMENTS

| | | |
|---|---|---|
| TW | 200820542 A | 5/2008 |
| TW | 201107984 A | 3/2011 |
| TW | I518511 B | 1/2016 |
| WO | WO-2008131486 A1 | 11/2008 |
| WO | WO-2010099483 A2 | 9/2010 |
| WO | WO-2010099483 A3 | 1/2011 |

OTHER PUBLICATIONS

"U.S. Appl. No. 12/714,054, Corrected Notice of Allowance dated Feb. 27, 2014", 4 pgs.

"U.S. Appl. No. 12/714,054, Final Office Action dated Apr. 19, 2013", 12 pgs.

"U.S. Appl. No. 12/714,054, Non Final Office Action dated Aug. 20, 2012", 11 pgs.

"U.S. Appl. No. 12/714,054, Notice of Allowance dated Jan. 17, 2014", 8 pgs.

"U.S. Appl. No. 12/714,054, Response filed Jan. 22, 2013 to Non Final Office Action dated Aug. 20, 2012", 12 pgs.

"U.S. Appl. No. 12/714,054, filed Sep. 19, 2013 to Final Office Action dated Apr. 19, 2013", 12 pgs.

"U.S. Appl. No. 12/714,054, filed Oct. 14, 2013 to Advisory Action dated Apr. 19, 2013", 12 pgs.

"Chinese Application Serial No. 201080016317.4, Amendment filed Sep. 29, 2014", 6 pgs.

"Chinese Application Serial No. 201080016317.4, Office Action dated May 20, 2014", 3 pgs.

"Chinese Application Serial No. 201080016317.4, Office Action dated Sep. 3, 2013", 12 pgs.

"Chinese Application Serial No. 201080016317.4, Response filed Jan. 16, 2014 to Office Action dated Sep. 3, 2013", 8 pgs.

"Chinese Application Serial No. 201080016317.4, filed Aug. 4, 2014 to Office Action dated May 20, 2014", 7 pgs.

"International Application Serial No. PCT/US2010/025649, International Preliminary Report on Patentability dated Sep. 9, 2011", 6 pgs.

"International Application Serial No. PCT/US2010/025649, Search Report dated Oct. 8, 2010", 5 pgs.

"International Application Serial No. PCT/US2010/025649, Written Opinion dated Oct. 8, 2010", 4 pgs.

"Korean Application Serial No. 10-2011-7022619, Amendment filed Mar. 20, 2015", 15 pgs.

"Taiwanese Application Serial No. 099105845, Amendment filed Mar. 1, 2013".

"Taiwanese Application Serial No. 099105845, Office Action dated Apr. 29, 2015", 7 pgs.

"Taiwanese Application Serial No. 099105845, Response filed Aug. 4, 2015 to Office Action dated Apr. 29, 2015", 42 pgs.

* cited by examiner

BATTERY CHARGE TERMINATION VOLTAGE REDUCTION

CLAIM OF PRIORITY

This application claims the benefit of priority under 35 U.S.C. § 119(e) of James A. Meacham II et al. U.S. Provisional Patent Application Ser. No. 62/275,983, titled "BATTERY CHARGE TERMINATION VOLTAGE REDUCTION IN PRESENCE OF SYSTEM LOAD," filed on Jan. 7, 2016, which is incorporated by reference herein in its entirety.

BACKGROUND

Mobile electronic devices, such as cellular phones, smart phones, mobile computing device, or one or more other mobile electronic devices, include one or more energy storage components, such as a lithium-ion battery, etc., that require charge.

Traditional chargers include constant-current or constant-voltage chargers. A constant-current charger can apply a constant charging current to the battery at the beginning of a charging cycle, when the voltage of a battery is low. Once the voltage of the battery reaches a threshold, a constant-voltage charger can apply a constant charging voltage at or near the desired full-charge voltage of the battery, until the battery is fully charged.

Other charging methods have developed, including linear, switch-mode, or pulse chargers. A linear charger can use a pass transistor in an active mode to reduce a travel or other adapter voltage to a desired battery voltage. However, such a charger dissipates a relatively large amount of power in reducing the travel adapter voltage to the desired level. In contrast, a switch-mode charger can use a pass transistor in either a fully-on or a fully-off state, dissipating a substantially smaller amount of power. A pulse charger combines the benefits of linear and switch-mode chargers, pulsing a constant-current pulse to charge the battery.

OVERVIEW

This document discusses, among other things, apparatus, systems, and methods to prevent a voltage of a charging battery from exceeding a voltage threshold, including receiving charging information from a battery and controlling an output current of a travel adapter, including adjusting the received battery current information using a load current to prevent the voltage of the battery from exceeding a voltage threshold, and providing output current limit information to the travel adapter using the adjusted battery current information.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
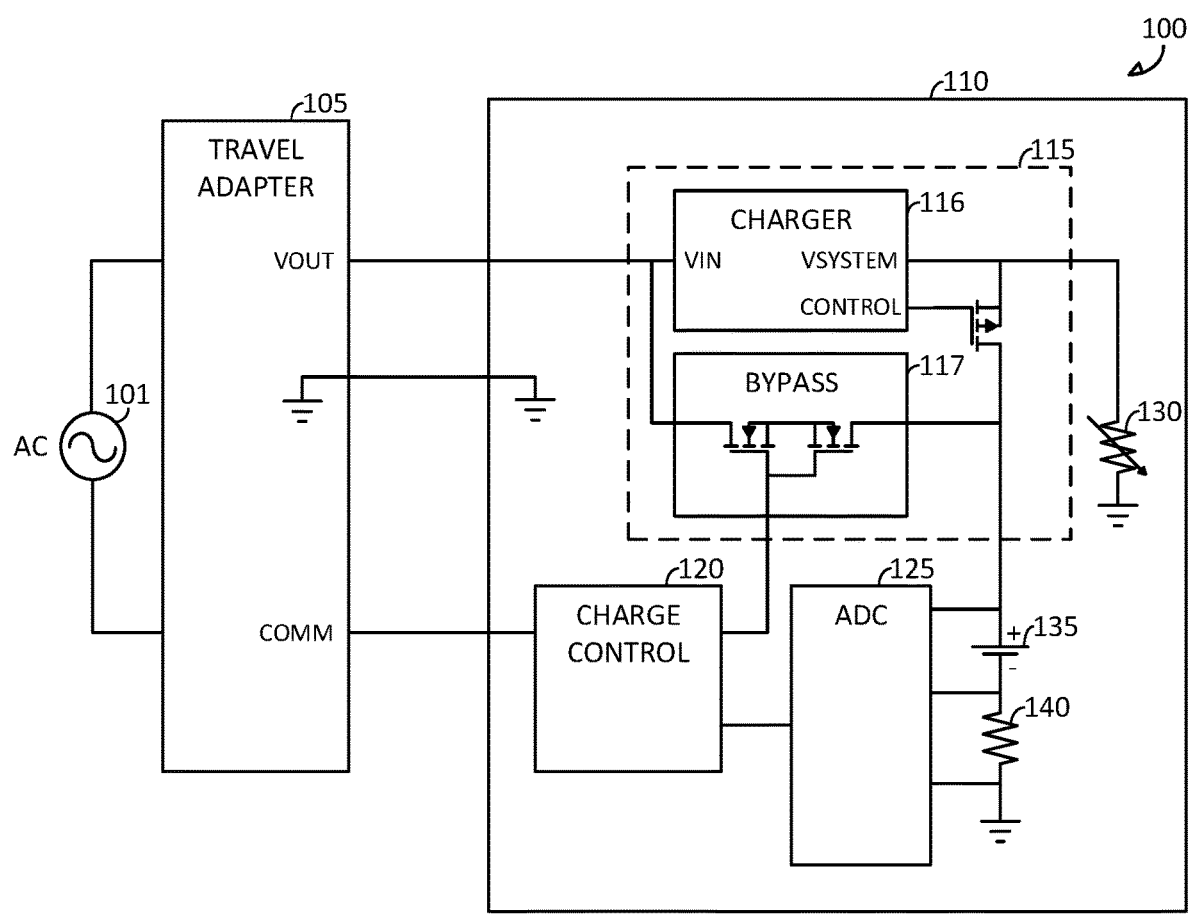
FIG. 1 illustrates an example system including a travel adapter, a battery-powered device, and a charge circuit configured to provide charging power (e.g., one or more of a specific charge current or charge voltage, etc.) to a battery.

A charging circuit, for example, including one or more conventional chargers, such as a linear, switch-mode, or pulse charger, can communicate with a travel adapter or other alternating current (AC) to direct current (DC) adapter, such as to control or limit one or more output conditions of the travel adapter. Under certain travel adapter output conditions, such as a known or controlled travel adapter output voltage or current, a bypass charge circuit can be used to provide charging power from the travel adapter to the battery, bypassing the charger or charging circuit, reducing power dissipation in the charging circuit during battery charging, reducing heat dissipated in the battery or the mobile device, reducing charge time of the battery, or reducing potential damage to the battery or one or more other components of the mobile device associated with one or more existing chargers.

The battery voltage is typically monitored while the bypass charge path is enabled, to ensure that a maximum battery voltage is not exceeded. When the monitored battery voltage approaches or exceeds the maximum battery voltage, a communication path between the bypass charge circuit or one or more other component of the charger or mobile device and the travel adapter is used to reduce the output current of the travel adapter. Once the travel adapter output current falls to a predefined level, or the battery voltage exceeds a threshold, the bypass charge path can be disabled and charging can be completed using one or more other charge circuits.

In certain examples, however, charging power provided by the travel adapter can be used to supply one or more other circuits in the device or a system coupled to the device. If the system suddenly stops drawing current, or if the load suddenly changes, that current is now available to charge the battery. This sudden increase in current can cause the battery voltage to rise above an intended maximum voltage. The bypass charge system will correct for such an increase, but not before exposing the battery to the higher, possibly harmful, voltage.

The present inventors have recognized, among other things, apparatus, systems, and methods to alleviate such conditions. In an example, a voltage of a battery can be monitored while a bypass charge path of a charge circuit is enabled. When the battery voltage exceeds a maximum allowed voltage, a communication channel between a mobile device and a travel adapter can be used to reduce the travel adapter output current. Once an output current of the travel adapter falls below a threshold, the bypass charge path can be disabled and charging can be completed using, for example, a switching or other charger or charging circuit.

Further, when charging using a bypass charge circuit, a load current can be detected, inferred, or estimated, and the measured battery current, for example, used to determine the travel adapter output current, can be adjusted or corrected, such that, if a load current suddenly changed, the output of the travel adapter would not exceed maximum allowed voltage for the battery.

In an example, a charge control circuit can infer a system load current by subtracting a measured battery current through a current sense resistor from a current limit in the travel adapter. The charge control circuit can reduce a battery voltage limit, or a travel adapter output current limit, proportionally to the inferred system load current. In other examples, the charge control circuit can close a bypass charge path through the bypass charge circuit and enable a charge path through one or more other charge circuits, in certain examples, with a reduced charge current proportional to the inferred system load current.

In other examples, the charge control circuit can directly measure a system load current, such as using one or more current sense elements (e.g., a voltage drop across a series resistor, or one or more other current sense elements, etc.). Further, in certain examples, the charge control circuit can be configured to adjust for the entire system load current, or to alleviate a portion of the potential risk associated with a sudden change in load current.

FIG. 1 illustrates an example system 100 including an alternating current (AC) source 101, a travel adapter 105, and a battery-powered device 110 (e.g., a mobile electronic device, etc.) including a charge circuit 115 configured to provide charging power (e.g., one or more of a specific charge current or charge voltage, etc.) to a battery 135. The battery-powered device 110 (e.g., a mobile electronic or other device having a battery) can include a charge control circuit (CCC) 120 configured to prevent a voltage of the battery 135 from rising above a voltage threshold, for example, protecting the battery 135 from damage associated with excessive current, voltage, or one or more other conditions associated therewith, such as heat, etc.

The AC source 101 can include a wall source, such as a residential or commercial electrical service (e.g., 110-120V/60 Hz, 220-240V/50 Hz, etc.). The travel adapter 105 can be configured to receive an AC voltage from the AC source 101, convert the received AC voltage into a DC voltage, and provide the converted DC voltage as an output voltage (VOUT). In other examples, the travel adapter 105 can be configured to receive power from one or more other sources (e.g., 12-15V DC from an automobile battery; 48V from a home solar or battery bank system; etc.), and convert the received power into the output voltage.

In certain examples, the travel adapter 105 can include a communication channel (e.g., a universal serial bus (USB) type-C or other communication channel, single-wire communication channel, etc.) configured to receive information from or provide information to the battery-powered device 110 or one or more other components, inputs, outputs, etc. In an example, the travel adapter 105 can be configured to provide the output voltage (VOUT) according to one or more voltage or current limits, depending on, in certain examples, information received from the battery-powered device 110, from the AC source 101, or from one or more other components or inputs.

The charge circuit 115 can include a charger 116 (e.g., a linear charger, a switching charger, a pulsed charger, etc.) and a bypass charge circuit 117. The charger 116 can be configured to provide charging power to the battery 135, such as when a voltage or current of the battery 135 or a variable load 130 is above or below a threshold. For example, when a voltage of the battery 135 is at or above a bypass threshold, the charger 116 can be enabled and configured to provide one or more of charging power to the battery 135 or power to one or more system component or the variable load 130.

In contrast, when the voltage across the current sense resistor 140 is below the bypass threshold, the bypass charge circuit 117 can be enabled and configured to provide one or more of charging power to the battery 135 or power to one or more system component or the variable load 130, bypassing losses and heat associated with the charger 116, and generally increasing the speed at which the battery 135 can be charged in comparison to using the charger 116. Use of the bypass charge circuit 117, however, introduces risks, as the bypass charge circuit 117 can be provide a largely unregulated power delivery path from the travel adapter 105 to the battery 135, with less protection than the charger 116, which typically provides a voltage or current regulated charging power to the battery 135, the variable load 130, or one or more other system components.

Accordingly, the charge control circuit 120 can include a communication channel configured to provide information to, or receive information from, the travel adapter 105. The charge control circuit 120 can be configured to receive information from the battery 135, or the current sense resistor 140, such as through an analog-to-digital converter (ADC) 125 or one or more other circuits, etc., control the bypass charge circuit 117, and provide information to the travel adapter 105.

In an example, the charge control circuit 120 can be configured to adjust the received information from the battery 135 (e.g., a battery voltage or current, etc.) using a load current, such as to prevent the voltage of the battery from exceeding a voltage threshold during sudden changes in system load, represented in FIG. 1, for example, as a variable load 130. In an example, the variable load 130 can include power used by one or more component of the battery-powered device 110, or one or more components coupled to or powered by the battery-powered device 110. The load current can be inferred or estimated, such as using a difference between the output current or current limit of the travel adapter 105 and a current of the battery, such as sensed by the current sense resistor 140, or provided by the battery or the battery-powered device (e.g., as a "fuel gauge" or otherwise, etc.). In other examples, the load current can be sensed, directly, such as using one or more other current sense elements (not shown), such as a current sense resistor 140 in the output elsewhere in the output path of the bypass charge circuit 117, before the battery 135, or in one or more other output path of the charge circuit 115 or battery-powered device 110.

The communication channel can include a USB communication channel (e.g., USB Type-C, vendor-defined message (VDM), etc.), a single-wire communication channel, or one or more other communication channels or interfaces. The charge control circuit 120 can provide a control signal to the travel adapter 105, or one or more representations of the information from the battery 135 or the current sense resistor 140.

The charge control circuit 120 can be configured to provide the adjusted battery information to the travel adapter 105, such that, if there are sudden changes in load current, the voltage to the battery 135 from the charge circuit 115 will not exceed a voltage threshold or safe level for the battery 135. In an example, the travel adapter 105 can adjust an output current limit using the received adjusted battery information from the charge control circuit 120, or the charge control circuit 120 can control one or more of an output voltage or an output current of the travel adapter 105.

In certain examples, the charge control circuit can reduce the maximum voltage the battery is allowed to reach before directing the travel adapter to lower its current limit, such as, for example, by:

$$V_{LIMIT} = V_{TARGET} - I_{SYSTEM} \times R_{BATTERY}, \quad (1)$$

where, for example, $V_{LIMIT}$ is the maximum battery voltage before taking action, $V_{TARGET}$ is the maximum battery charging voltage, $I_{SYSTEM}$ is the inferred or measured system load current, and $R_{BATTERY}$ is the typical battery resistance as pre-determined by a step voltage.

Figure 2:
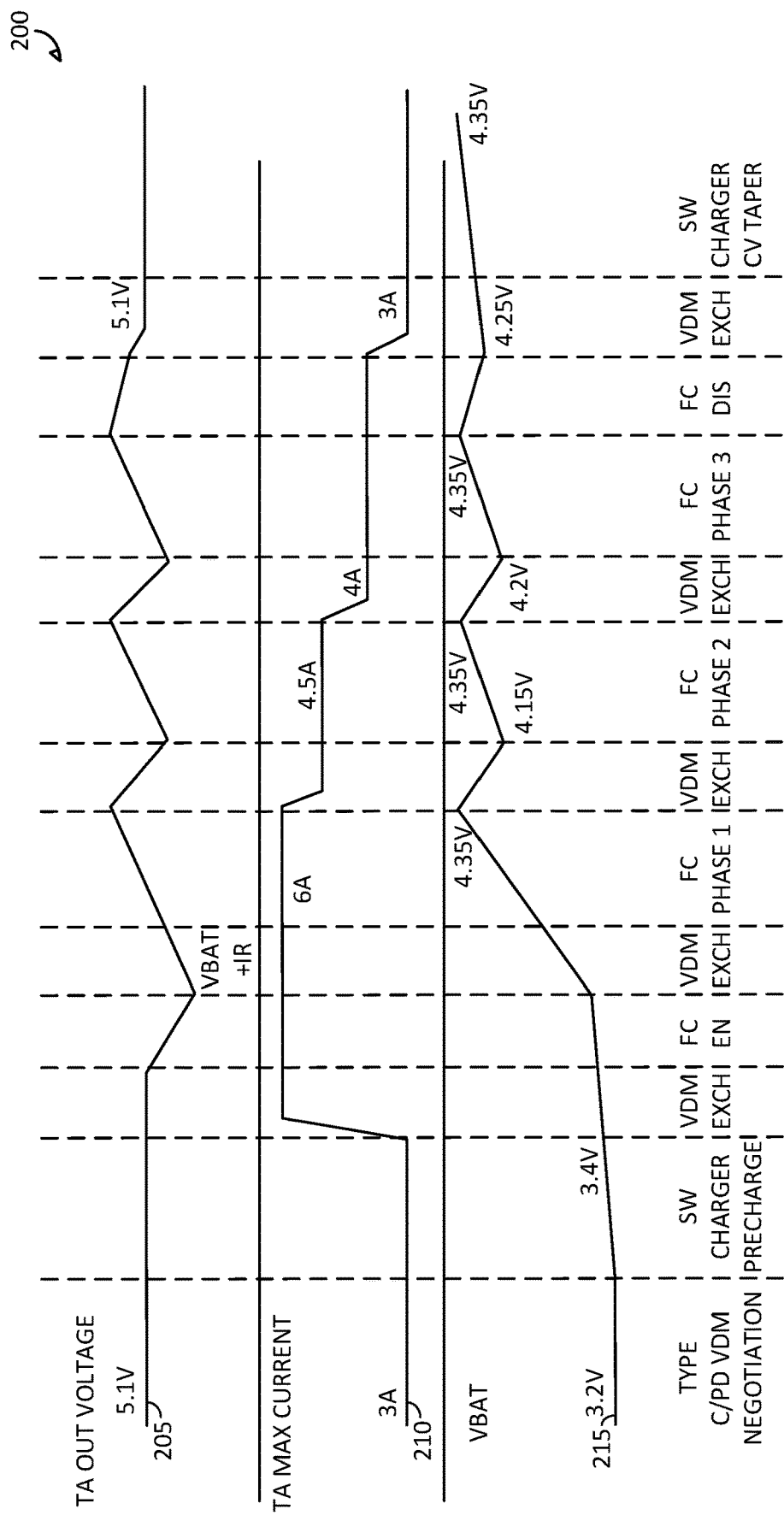
FIG. 2 illustrates an example bypass charge circuit charge sequence.

FIG. 2 illustrates generally an example bypass charge circuit charge sequence 200 using a bypass charge circuit, including a travel adapter (TA) output voltage (TA OUT VOLTAGE) 205, a TA output current limit (TA MAX CURRENT) 210, and a battery voltage (VBAT) 215. The sequence illustrates communication between a TA and a charger, such as using a universal serial bus (USB) type-C, power delivery (PD) vendor-defined message (VDM) negotiation, where battery voltage can be communicated to the TA, for example.

The charge sequence of FIG. 2 illustrates an interplay between a switching (SW) charger in a precharge mode, a fast charge (FC) charger, for example, including a bypass charge circuit having enable (EN), disable (DIS), and charging phases (e.g., phase 1, phase 2, phase 3, etc.), and the SW charger in a constant-voltage (CV) taper mode. In the example of FIG. 2, the FC phases are periodically interrupted using a VDM exchange (EXCH), such as to update the TA with information from the battery.

Figure 3:
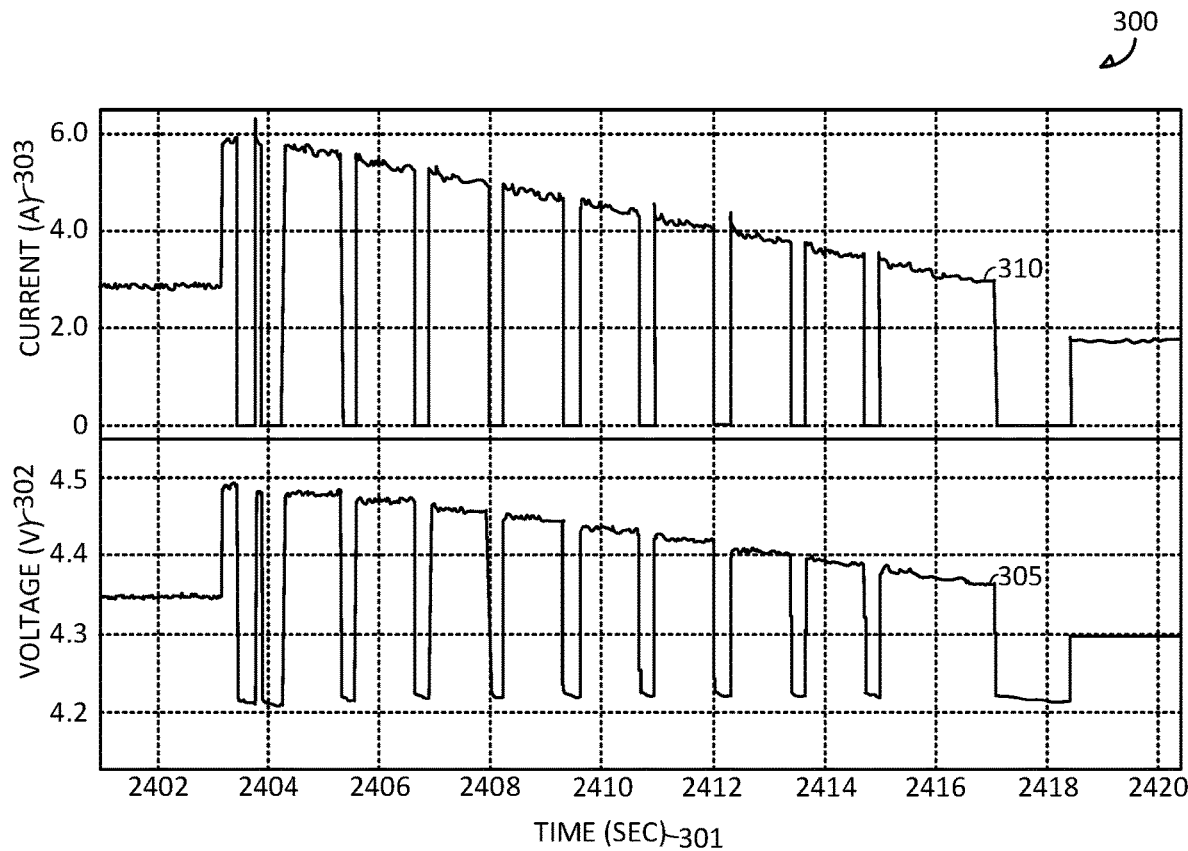
FIG. 3 illustrates an example charge current and voltage.

FIG. 3 illustrates generally an example charging sequence 300, with voltage 302, current 303, and time 301 axes, including a battery voltage 305 and a battery current 310.

For example, at 2403, a load current can suddenly stop, increasing the current provided to the battery, and accordingly, increasing the battery voltage above an intended maximum voltage level, possibly harming the battery or one or more other system components. A control system, for example, a charge control circuit, can detect the increase and communicate with the a travel adapter or other power source to decrease the output current, or change to one or more other charging modes or charge circuits. However, each process requires time, disrupts charging, and potentially exposes the battery or other electronics to harmful temperatures, voltages, or currents.

In the example of FIG. 3, a sudden rise in current from nearly 3 A at 2402 increases to nearly 6 A at 2403, causing an increase in battery voltage from 4.35 V at 2402 to nearly 4.5V at 2403. The battery voltage is gradually stepped down, but not before the sudden rise. The charge control circuit described herein can alleviate or avoid such sudden increases, protecting the battery and other electronic system components.

Figure 4:
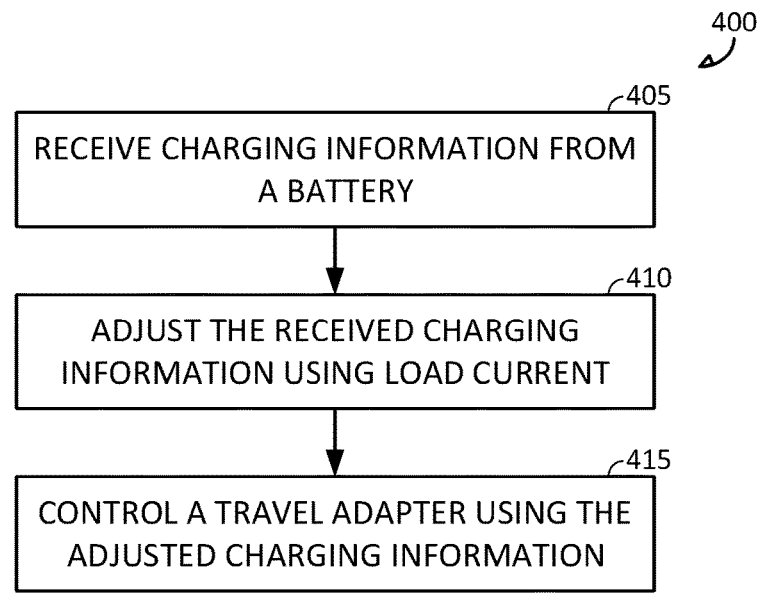
FIG. 4 illustrates an example method to prevent a battery voltage from exceeding a threshold.

FIG. 4 illustrates an example method 400 to prevent a battery voltage from exceeding a threshold, such as during charging. At 405, charging information, such as a battery voltage or current information, can be received from a battery, for example, at a charge control circuit. In an example, the charging information can be detected using an analog-to-digital (ADC) converter or other circuit configured to sample a voltage or otherwise receive information from a battery or a current sense resistor coupled to or in series with the battery. In an example, an output current of a travel adapter or other power source can be controlled, such as using the charge control circuit to communicate with the travel adapter or other power source.

At 410, the received charging information can be adjusted using a load current. In an example, a load current can be received at the charge control circuit. The load current can include an estimated load current, information to estimate the load current, or a sensed load current or information about the sensed load current. One or more of the received battery voltage or current information can be adjusted using the received load current.

At 415, a travel adapter is controlled using the adjusted charging information. For example, output current information can be provided to the travel adapter using one or more of the adjusted battery voltage or current information. In other examples, the charge control circuit can directly control the travel adapter.

Additional Notes and Examples

An example (e.g., "Example 1") of subject matter (e.g., an apparatus) may include a charge control circuit configured to receive charging information from a battery, including battery current information, and to control an output current of a travel adapter, wherein the charge control circuit is configured to: adjust the received battery current information using a load current to prevent the voltage of the battery from exceeding a voltage threshold; and provide output current limit information to the travel adapter using the adjusted battery current information.

In Example 2, the subject matter of Example 1 may optionally be configured to include a mobile device and a battery, wherein the mobile device includes the charge control circuit, and wherein the travel adapter is separate from the mobile device, and is configured to receive an alternating current (AC) input and provide a direct current (DC) output.

In Example 3, the subject matter of any one or more of Examples 1-2 may optionally be configured such that the charge control circuit is configured to estimate the load current using output current information of the travel adapter and the received battery current information.

In Example 4, the subject matter of any one or more of Examples 1-3 may optionally be configured to include a load current sense element configured to sense the load current, wherein the charge control circuit is configured to adjust the received battery current information using the sensed load current.

In Example 5, the subject matter of any one or more of Examples 1-4 may optionally be configured such that the charging information includes battery voltage information, and the charge control circuit is configured to adjust the received battery voltage information using the load current, wherein the apparatus may be optionally configured to include: a charger configured to receive the output voltage of the travel adapter; and a bypass charge circuit configured to receive the output voltage of the travel adapter, wherein the charger is configured to charge the battery when the adjusted battery voltage information is greater than or equal to a bypass threshold, and wherein the charge control circuit is configured to control the bypass charge circuit to charge the battery when the adjusted battery voltage information is less than the bypass threshold.

In Example 6, the subject matter of any one or more of Examples 1-5 may optionally be configured such that the charging information includes battery voltage information, and the charge control circuit is configured to: adjust the received battery voltage information using the load current; control an output current limit of the travel adapter using the adjusted battery current information; and control a bypass charge circuit using the adjusted battery voltage information.

In Example 7, the subject matter of any one or more of Examples 1-6 may optionally be configured to include a current sense resistor configured to sense the battery current information, wherein the received charging information includes the sensed battery current information.

An example (e.g., "Example 8") of subject matter (e.g., a system to prevent a voltage of a battery from exceeding a voltage threshold) may include a travel adapter configured to provide an output voltage; and a mobile device, configured to be coupled to the travel adapter, including: a battery; a bypass charge circuit configured to receive the output voltage of the travel adapter; and a charge control circuit configured to receive charging information from the battery, including battery voltage and current information, and to control an output voltage and an output current of a travel adapter, wherein the charge control circuit is configured to: adjust the received battery voltage and current information using a load current; control the bypass charge circuit to charge the battery when the adjusted battery voltage information is less than a bypass threshold; and control an output current limit of the travel adapter using the adjusted battery current information.

In Example 9, the subject matter of Example 8 may optionally be configured to include a current sense resistor configured to sense a voltage drop representative of the current of the battery; and an analog-to-digital converter (ADC) configured to receive battery voltage information and the voltage drop from the current sense resistor, wherein the received charging information includes information from the ADC.

In Example 10, the subject matter of any one or more of Examples 8-9 may optionally be configured to include a charger configured to receive the output voltage of the travel adapter, and to charge the battery when the received battery voltage information is greater than or equal to a bypass threshold.

In Example 11, the subject matter of any one or more of Examples 8-10 may optionally be configured such that the travel adapter is separate from the mobile device, and is configured to receive an alternating current (AC) input and provide a direct current (DC) output.

In Example 12, the subject matter of any one or more of Examples 8-11 may optionally be configured such that the charge control circuit is configured to estimate the load current using the output current limit of the travel adapter and the received battery current information.

In Example 13, the subject matter of any one or more of Examples 8-12 may optionally be configured to include a load current sense element configured to sense the load current, wherein the charge control circuit is configured to adjust the received battery voltage and current information using the sensed load current.

An example (e.g., "Example 14") of subject matter (e.g., a method) may include receiving charging information from a battery, including battery current information, using a charge control circuit; and controlling, using the charge control circuit, an output current of a travel adapter, including: adjusting the received battery current information using a load current to prevent the voltage of the battery from exceeding a voltage threshold; and providing output current limit information to the travel adapter using the adjusted battery current information.

In Example 15, the subject matter of Example 14 may optionally be configured such that the travel adapter is separate from the mobile device, the method including: receiving an alternating current (AC) input at the travel adapter; and providing a direct current (DC) output using the travel adapter.

In Example 16, the subject matter of any one or more of Examples 14-15 may optionally be configured such that adjusting the received battery current information using the load current includes: estimating the load current using output current information of the travel adapter and the received battery current information.

In Example 17, the subject matter of any one or more of Examples 14-16 may optionally be configured to include sensing the load current using a load current sense element, wherein adjusting the received battery current information includes using the sensed load current.

In Example 18, the subject matter of any one or more of Examples 14-17 may optionally be configured such that receiving charging information includes receiving battery voltage information, wherein the method may optionally be configured to include: adjusting the received battery voltage information using the load current; receiving the output voltage of the travel adapter using a charger; receiving the output voltage of the travel adapter using a bypass charge circuit; charging the battery using the charger when the adjusted battery voltage information is greater than or equal to a bypass threshold; and controlling the bypass charge circuit to charge the battery when the adjusted battery voltage information is less than the bypass threshold.

In Example 19, the subject matter of any one or more of Examples 14-18 may optionally be configured such that receiving charging information includes receiving battery voltage information, wherein the method may optionally be configured to include: adjusting the received battery voltage information using the load current; controlling an output current limit of the travel adapter using the adjusted battery current information; and controlling a bypass charge circuit using the adjusted battery voltage information.

In Example 20, the subject matter of any one or more of Examples 14-19 may optionally be configured to include sensing the battery current information using a current sense resistor, wherein receiving charging information includes receiving the sensed battery current information.

An example (e.g., "Example 21") of subject matter (e.g., a system or apparatus) may optionally combine any portion or combination of any portion of any one or more of Examples 1-20 to include "means for" performing any portion of any one or more of the functions or methods of Examples 1-20, or a "machine-readable medium" (e.g., non-transitory, etc.) including instructions that, when performed by a machine, cause the machine to perform any portion of any one or more of the functions or methods of Examples 1-20.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMS), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus, comprising:
a charge control circuit configured to be communicatively coupled to an adapter and a charge circuit that includes a charger and a bypass charge circuit that includes a switch having a terminal directly connected to a battery, the charge control circuit configured to receive charging information from the battery, including battery current information, and to control an output current of the adapter, the output current of the adapter coupled to the bypass charge circuit so that while the bypass charge circuit is enabled, the output current bypasses the charger to provide charging power directly from the adapter to the battery through the switch,
wherein the charge control circuit is further configured to:
adjust the received battery current information using a load current that is determined by a difference between a sensed battery current and a current limit of the adapter; and
reduce the output current of the adapter proportionally to the determined load current to prevent a voltage of the battery from exceeding a voltage threshold while the bypass charge circuit is enabled.

2. The apparatus of claim 1, wherein:
the apparatus is a mobile device; and
wherein the mobile device includes the charge control circuit, and
wherein the adapter is separate from the mobile device, and is configured to receive an alternating current (AC) input and provide a direct current (DC) output.

3. The apparatus of claim 1, including:
a load current sense element configured to sense the load current,
wherein the charge control circuit is configured to adjust the received battery current information using the sensed load current.

4. The apparatus of claim 1, wherein the charging information includes battery voltage information, and
wherein the charge control circuit is configured to adjust the received battery voltage information using the load current,
wherein:
the charger is configured to receive an output voltage of the adapter; and
the bypass charge circuit is configured to receive the output voltage of the adapter,
wherein the charger is configured to charge the battery when the adjusted battery voltage information is greater than or equal to a bypass threshold, and
wherein the charge control circuit is configured to control the bypass charge circuit to charge the battery when the adjusted battery voltage information is less than the bypass threshold.

5. The apparatus of claim 1, wherein the charging information includes battery voltage information, and
wherein the charge control circuit is configured to:
adjust the received battery voltage information using the load current;
control an output current limit of the adapter using the adjusted battery current information; and
control the bypass charge circuit using the adjusted battery voltage information.

6. The apparatus of claim 1, including:
a current sense resistor configured to sense the battery current information,
wherein the received charging information includes the sensed battery current information.

7. A system to prevent a voltage of a battery from exceeding a voltage threshold, comprising:
an adapter configured to provide an output voltage; and
a mobile device, configured to be coupled to the adapter, including:
a battery;
a charge circuit that includes a charger and a bypass charge circuit that includes a switch having a terminal directly connected to the battery, the bypass charge circuit configured to receive the output voltage of the adapter and, while enabled, to bypass the charger to provide charging power directly from the adapter to the battery through the switch; and
a charge control circuit configured to be communicatively coupled to the adapter and the charge circuit, the charge control circuit configured to receive charging information from the battery, including battery voltage and current information, and to control an output voltage and an output current of the adapter while the bypass charge circuit is enabled,
wherein the charge control circuit is further configured to:
adjust the received battery voltage and current information using a load current that is determined by a difference between a sensed battery current and a current limit of the adapter;
enable the bypass charge circuit to charge the battery when the adjusted battery voltage information is less than a bypass threshold; and
reduce the output current of the adapter proportionally to the determined load current to prevent the voltage of the battery from exceeding the voltage threshold while the bypass charge circuit is enabled.

8. The system of claim 7, including:
a current sense resistor configured to sense a voltage drop representative of the current of the battery; and
an analog-to-digital converter (ADC) configured to receive battery voltage information and the voltage drop from the current sense resistor,
wherein the received charging information includes information from the ADC.

9. The system of claim 7, wherein:
the charger is configured to receive the output voltage of the adapter, and to charge the battery when the received battery voltage information is greater than or equal to a bypass threshold.

10. The system of claim 7, wherein the adapter is separate from the mobile device, and is configured to receive an alternating current (AC) input and provide a direct current (DC) output.

11. The system of claim 7, including:
a load current sense element configured to sense the load current,
wherein the charge control circuit is configured to adjust the received battery voltage and current information using the sensed load current.

12. A method, comprising:
receiving charging information from a battery, including battery current information, using a charge control circuit configured to be communicatively coupled to an adapter and a charge circuit that includes a charger and a bypass charge circuit that includes a switch having a terminal directly connected to the battery; and
controlling, using the charge control circuit, an output current of the adapter, including:
enabling the bypass charge circuit to bypass the charger and couple the output current of the adapter to the battery to provide charging power directly from the adapter to the battery through the switch;
adjusting the received battery current information using a load current that is determined by a difference between a sensed battery current and a current limit of the adapter; and
reducing the output current of the adapter proportionally to the determined load current to prevent a voltage of the battery from exceeding a voltage threshold while the bypass charge circuit is enabled.

13. The method of claim 12, the battery, the charge control circuit, and the charge circuit are included in a mobile device and wherein the adapter is separate from the mobile device, the method including:
receiving an alternating current (AC) input at the adapter; and
providing a direct current (DC) output using the adapter.

14. The method of claim 12, including:
sensing the load current using a load current sense element,
wherein adjusting the received battery current information includes using the sensed load current.

15. The method of claim 12, wherein receiving charging information includes receiving battery voltage information, wherein the method includes:
adjusting the received battery voltage information using the load current;
receiving an output voltage of the adapter using the charger;
receiving the output voltage of the adapter using the bypass charge circuit;
charging the battery using the charger when the adjusted battery voltage information is greater than or equal to a bypass threshold; and
controlling the bypass charge circuit to charge the battery when the adjusted battery voltage information is less than the bypass threshold.

16. The method of claim 12, wherein receiving charging information includes receiving battery voltage information, wherein the method includes:
adjusting the received battery voltage information using the load current;
controlling an output current limit of the adapter using the adjusted battery current information; and
controlling the bypass charge circuit using the adjusted battery voltage information.

17. The method of claim 12, including:
sensing the battery current information using a current sense resistor,
wherein receiving charging information includes receiving the sensed battery current information.

* * * * *